(12) United States Patent
Emanuelli

(10) Patent No.: US 9,994,198 B1
(45) Date of Patent: Jun. 12, 2018

(54) WHEEL CLEANING IMPLEMENT

(71) Applicant: Eduardo Emanuelli, Guaynabo, PR (US)

(72) Inventor: Eduardo Emanuelli, Guaynabo, PR (US)

( * ) Notice: Subject to any disclaimer, the term of this patent is extended or adjusted under 35 U.S.C. 154(b) by 423 days.

(21) Appl. No.: 14/679,642

(22) Filed: Apr. 6, 2015

(51) Int. Cl.
 A46B 15/00 (2006.01)
 B60S 3/06 (2006.01)
 B60S 3/04 (2006.01)

(52) U.S. Cl.
 CPC ..................... *B60S 3/042* (2013.01)

(58) Field of Classification Search
 CPC ................... B60S 3/042; B60S 3/06
 See application file for complete search history.

(56) References Cited

U.S. PATENT DOCUMENTS

| 725,843 | A | | 4/1908 | Henn |
| 3,798,831 | A | | 3/1974 | Hihashi |
| 4,582,171 | A | | 4/1986 | Jezierski |
| 4,841,591 | A | | 6/1989 | Candow |
| 5,638,922 | A | | 6/1997 | Morikawa |
| 6,032,318 | A | * | 3/2000 | McLaughlin ........... A47L 13/29 |
| | | | | 15/228 |
| 6,434,781 | B1 | | 8/2002 | Guerra |
| 6,922,865 | B1 | | 8/2005 | Logan, Sr. |
| 6,968,588 | B2 | * | 11/2005 | Nemcek ................. B60S 3/042 |
| | | | | 15/256.5 |
| 8,117,707 | B1 | | 2/2012 | Ruh, II |
| 2008/0047085 | A1 | | 2/2008 | Kolarevoc et al. |

* cited by examiner

*Primary Examiner* — Shay Karls
(74) *Attorney, Agent, or Firm* — Luis Figarella

(57) ABSTRACT

A cleaning implement has one or more strategically placed brushes, stubs and/or permanent/disposable towels which engage the surfaces of a movable surface (including wheels or tires), and unique mechanical motion assistance means powered by motion, inertia and/or mechanical/electrical batteries to allow for the cleaning of a wheel or tire with a single hand operation.

11 Claims, 10 Drawing Sheets

WHEEL CLEANING IMPLEMENT

PATENTS CITED

The following documents and references are incorporated by reference in their entirety, Higashi (U.S. Pat. No. 3,798,831), Morikawa (U.S. Pat. No. 5,638,922), Ruh, II (U.S. Pat. No. 8,117,707), Guerra (U.S. Pat. No. 6,434,781), Thomasian (U.S. Pat. No. 3,732,756) and Henn (U.S. Pat. No. 725,943).

FIELD OF THE INVENTION

The present invention relates to the general art of cleaning and brushing, and to the particular field of cleaning implements for special applications, such as a brush for cleaning wheels of bicycles or trams using a single hand.

DESCRIPTION OF THE RELATED ART

As more and more people come to live a much more active life, people across all stages of life come to depend more and more on wheeled contrivances. These go from bicycles to baby/infant trams to hand pulled wheeled carts to bring groceries from the store to home.

The above trend combines with the more compact living trend, manifested in either vertical living within the city and/or smaller living spaces. These trends result in the elimination or loss of the traditional bike/tram/cart storage space in the garage/porch/yard/slush room, resulting in the inclusion of these contrivances into the traditional 'clean' living spaces (kitchens, hallways, etc.).

The above means that no longer is it ok to bring a wheeled cart or bicycle with dirty wheels (at least not without getting shouted at). So a quick and easy solution to cleaning those wheels must be conceived. Of course, it must also be convenient.

What the market needs, is an easy to use brush that preferably through a one handed operation can clean the dirt from a bicycle/tram/cart tire.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect the invention is about a cleaning implement comprising an elongated main body having a near and a distal end, said distal end having one or more cleaning assemblies attached and mechanical motion assistance means attached to said elongated main body, said means capable of inducing rotation on any wheel. In another aspect, said mechanical motion assistance means are comprised of one or more drive-wheels. In yet another aspect one or more of said drive-wheels is equipped with a ratchet mechanism that allows the rotation of said one or more drive-wheel in one direction only. In one aspect, said cleaning implement is equipped with energy storage means connected to one or more of said drive-wheels. In another aspect said energy storage means are electric storage and these are connected to one or more electric motors powering one or more of said drive-wheels, and one or more of said motors are activated through a switch in the cleaning implement body. In yet another aspect said energy storage means are mechanical energy storage means, connected to one or more of said drive-wheels.

In one aspect, the invention is about a cleaning implement comprising a body shaped to complementary fit the periphery of a wheel perimeter, including a cavity having one or more cleaning implements; and mechanical motion assistance means located within said body, said means capable of inducing rotation on any wheel. In another aspect said mechanical motion assistance means are comprised of flexible or semi-flexible walls capable of being pressed by a user and generating enough friction along the wheel body to induce its rotation. In yet another aspect said mechanical motion assistance means are comprised of one or more drive-wheels. In one aspect one or more of said drive-wheels is equipped with a ratchet mechanism that allows the rotation of said one or more drive-wheel in one direction only.

In another aspect one or more of said drive wheels is equipped with compliant means coupling it to said brush body. In yet another aspect said cleaning implement is equipped with energy storage means connected to one or more of said drive-wheels. In one aspect, said energy storage means are electric storage and these are connected to one or more electric motors powering said one or more drive-wheels, and one or more of said motors are activated through a switch in the cleaning implement body. In another aspect one or more of said drive wheels is equipped with compliant means coupling it to said cleaning implement body. In yet another aspect said energy storage means are mechanical energy storage means, connected to said one or more drive-wheels.

In one aspect one or more of said drive wheels is equipped with compliant means coupling it to said cleaning implement body. In yet another aspect said mechanical motion assistance means are comprised of one or more push-tabs. In another aspect one or more of said push-tabs is equipped with compliant means coupling it to said cleaning implement body. In another aspect said mechanical motion assistance means are comprised of one or more vertical continuous treads. In yet another aspect said mechanical motion assistance means are comprised of one or more horizontal continuous threads.

In one aspect, the invention is about a cleaning implement comprising; a body shaped to hold within it a portion of one or more external facing cleaning means mounted on a rotating assembly and mechanical motion assistance means located within said body, said means capable of inducing rotation on said cleaning means rotating assembly. In another aspect, said cleaning means rotating assembly is comprised of a continuous treads having one or more drive wheel and/or one or more bogies. In yet another aspect said mechanical motion assistance means are comprised of one or more drive-wheels. In another aspect one or more of said drive-wheels is equipped with a ratchet mechanism that allows the rotation of said one or more drive-wheel in one direction only. In yet another aspect said cleaning implement is equipped with energy storage means connected to one or more of said drive-wheels.

In another aspect said energy storage means are electric storage and these are connected to one or more electric motors powering said one or more drive-wheels, and one or more of said motors are activated through a switch in the cleaning implement body. In yet another aspect one or more of said drive wheels is equipped with compliant means coupling it to said cleaning implement body. In another aspect said energy storage means are mechanical energy storage means, connected to said one or more drive-wheels. In one aspect said cleaning means rotating assembly is comprised of a single wheel.

Other features and advantages of the present invention will become apparent upon examining the following detailed description of an embodiment thereof, taken in conjunction with the attached drawings.

Figure 1:
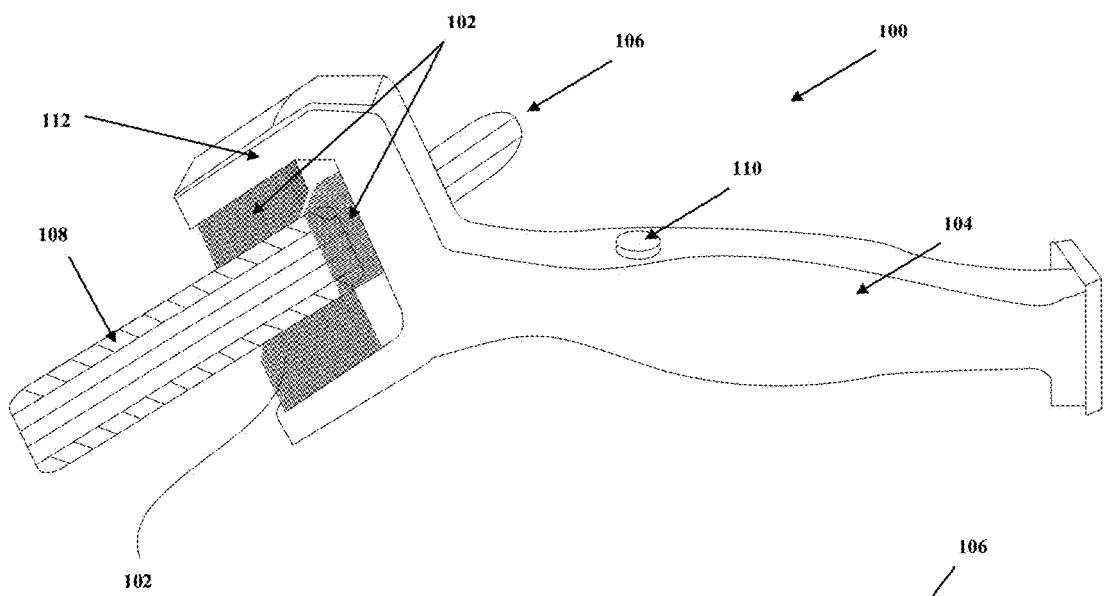
FIG. 1 shows a perspective view of cleaning implement having the attached rotational means, according to an exemplary embodiment of the invention.

The above-described and other features will be appreciated and understood by those skilled in the art from the following detailed description, drawings, and appended claims.

DETAILED DESCRIPTION OF THE PREFERRED EMBODIMENT

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Referring to FIG. 1, we see an exemplary embodiment 100 of the present invention comprised of a main body or handle 104 having one or more cleaning assemblies 102 located at a distal end 112 of said body 104, in addition to one or more mechanical motion assistance means, such as the wheel motion assistance assembly 106. As shown in FIG. 1, in one embodiment, the cleaning implement or brush is designed to be used so that all or part of the opening housing the one or more cleaning assemblies 102 (which may be brushes, bristles, and others) that come in contact all or portions of the wheel 108 intended to be cleaned.

Note that the cleaning assemblies 102/302 need not be only a collection of brushes (any combination of bristles, hair or wire set into a block or holder), but may also include spikes, nubs, rubber, plastic friction, wet and/or dry/damp permanent or disposable towels (such as swiffer pads) and/or any other suitable combination of the above or similar arrangements (alone or in combination) of friction devices capable of removing or loosening dirt from a surface.

In one embodiment these cleaning assemblies are brush assemblies or brushes 102 are permanently affixed, wherein in another they are removable. In such an embodiment, by locating the one or more brushes in grooves, the brushes will be frictionally held in position on said distal end. The brushes can be slid into or out of the grooves for cleaning or replacement as necessary.

In one embodiment, the wheel 108 is cleaned by inserting all or portions of it into the brush 104 opening, then moving the brush along the perimeter of said wheel and thus forcing the brush assemblies to come in contact with the dirt on said wheel surface. The movement of the brush assemblies along the perimeter of the wheel may be accomplished by moving the brush, rotating the wheel and/or a combination thereof.

Of course, the above action would require either lifting the wheel, or holding it with both hands to perform the wheel rotation while the holding the brush with the other. Henn (U.S. Pat. No. 725,943) teaches us to flip the bike, and Guerra (U.S. Pat. No. 6,434,781) suggests we permanently mount these on the cart.

Figure 2:
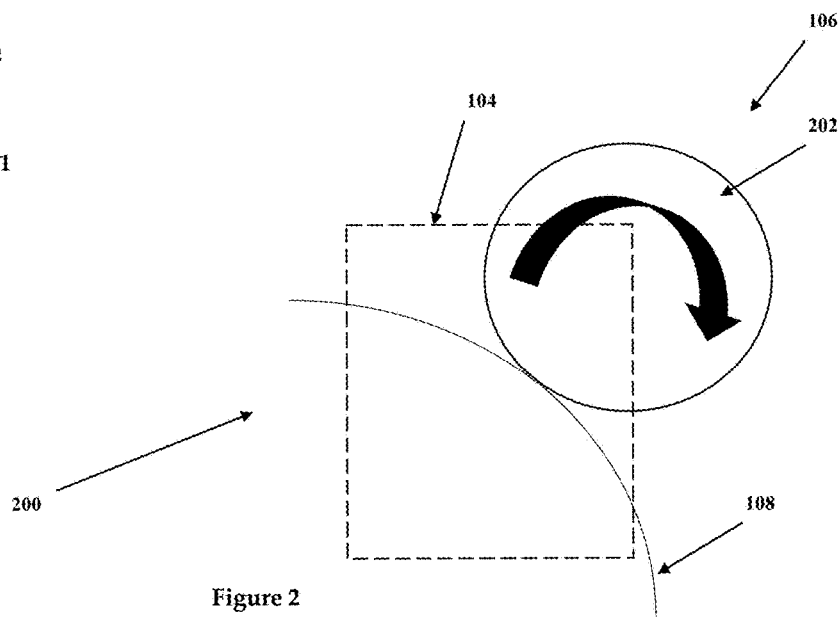
FIG. 2 shows a side view of proposed wheel rotation means, according to an exemplary embodiment of the invention.

The applicant proposes the improvement of the prior art, by providing the brush 104 with wheel motion assistance means 106, capable of rotating the wheel through contact/friction engagement with the wheel or tire surfaces. In one embodiment, seen in FIG. 2, the mechanical motion assistance means are provided by one or more drive-wheels 202 attached to the brush 104, so that when the drive-wheel 202 makes contact with the wheel or tire 108, the friction of any motion by the drive-wheel 202 causes an equal or proportional and opposite motion of the wheel or tire 108 which then causes the brushes 102 to clean the wheel.

An alternate motion assembly may be provided by water flowing through the drive wheels 202, which would provide both motion/torque and a softening agent to loosen encrusted dirt. A similar approach would include the attachment of a vacuum cleaner's suction end, so that the dirt coming off the wheel or cleaned surface is removed before it falls on the floor, right after it is cleaned. In addition, such suction could be used through a venturi arrangement or directly, to power the mechanical motion means or drive-wheels.

The drive-wheel 202 may be powered by a number of energy sources, some of which will include electrical or mechanical batteries or energy storage means. The simplest is a one way ratchet mechanism similar to that within a ratchet wrench, such as that in Thomasian (U.S. Pat. No. 3,732,756). Such a mechanism (biased so that the drive-wheel can only move in one direction), would allow the user to free the wheel/tire (say by raising the wheel of the bike/tram/cart off the floor), then apply pressure to the wheel 108 via the drive-wheel 202 in the 'locked' ratchet direction, which would result in the wheel 108 rotating, and causing the wheel 108 perimeter to pass through the brushes 102 and be cleaned. As with a bicycle 'derailleur', the drive-wheel 202 would be free wheeling when the wheel 108 moves (due to inertia) along the 'unlocked' direction, much like a ratchet set in the 'unlocked' direction.

Another simple embodiment would be to equip either the drive-wheel 202 or the brush body 104 with an electrical battery (disposable, rechargeable, solar) and an electric motor (either inside the wheel 202 or in the body brush and linked to the wheel 202 via mechanical means such as a drive, belt, etc.). In this fashion, when the user presses the button 110, the drive-wheel 202 would rotate the free wheel 108 and clean it with the brushes 102. In an alternate embodiment, the unit is powered through a lever hinged at the mechanical motion assistance means, so that squeezing the handle produces the motion desired.

In another embodiment, the drive-wheel 202 is equipped with a mechanical energy storage means such as a mechanical spring or battery (again, like the electric/motor above), located either inside the drive-wheel 202 or the brush handle/body 104 and mechanically linked to the drive-wheel 202. Such devices are similar to watch springs, or wind-up mechanisms such as those shown in Higashi (U.S. Pat. No. 3,798,831) and/or Morikawa (U.S. Pat. No. 5,638,922).

To use the mechanical battery, the user may spin the drive-wheel 202 against the stationary wheel/tire 108, which by being in contact with the floor can't move, charging or 'winding up' the mechanical battery (by winding a spring, for example). When the user then lifts the wheel 108 off the floor, the drive-wheel 202 is free to rotate the wheel 108, cleaning the wheel 108 as it moves past the brushes 102. Similarly, the user may 'wind up' the drive-wheel 202 the wheel through friction against the wall, floor, pants, and then apply the drive-wheel 202 to the tire/wheel 108 as it begins to 'unwind'.

Figures 3, 4:
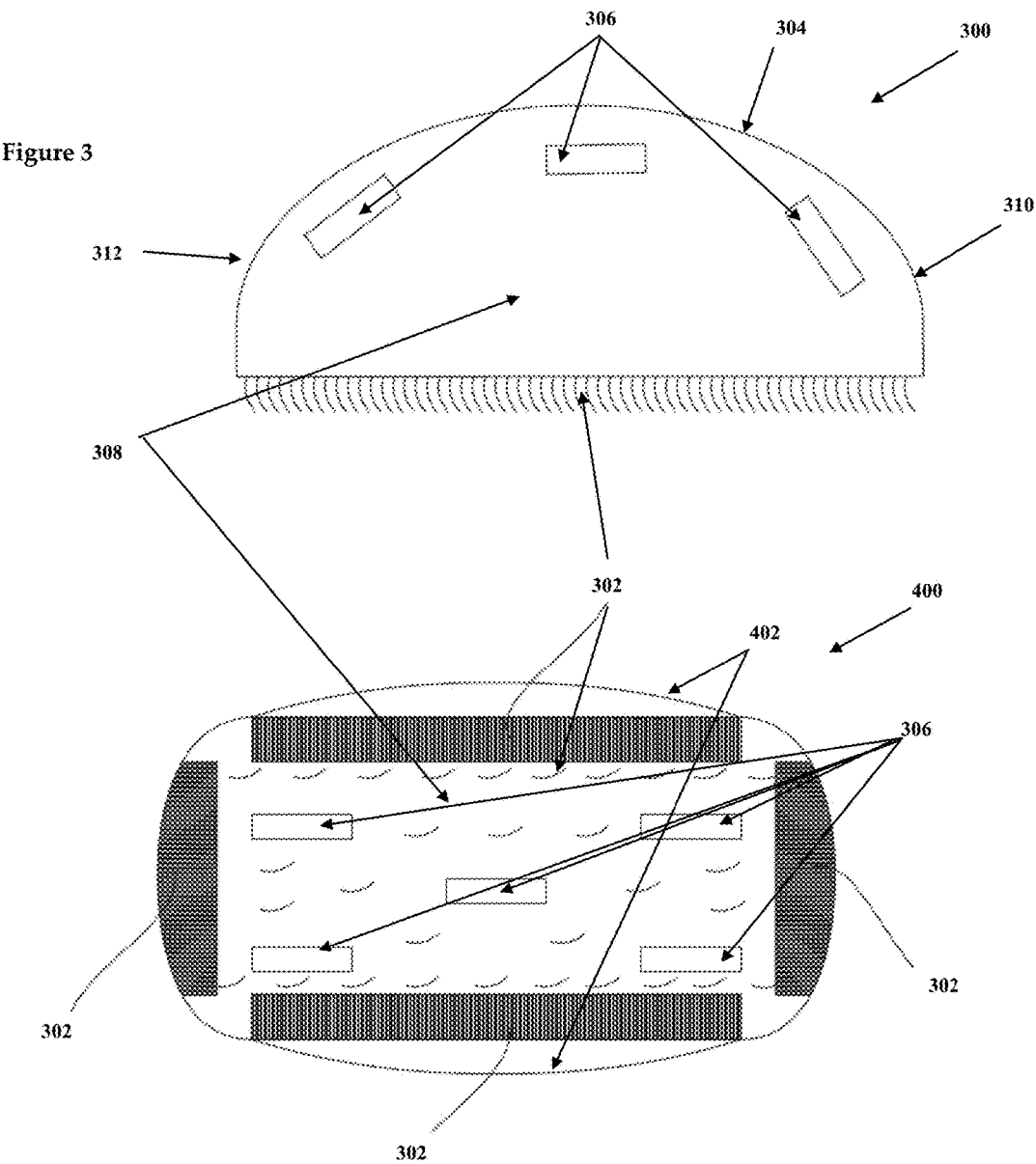
FIG. 3 shows a side view of a cleaning implement having the attached rotational means, according to an exemplary embodiment of the invention.
FIG. 4 shows a bottom view of a cleaning implement having the attached rotational means, according to an exemplary embodiment of the invention.
Figure 5:
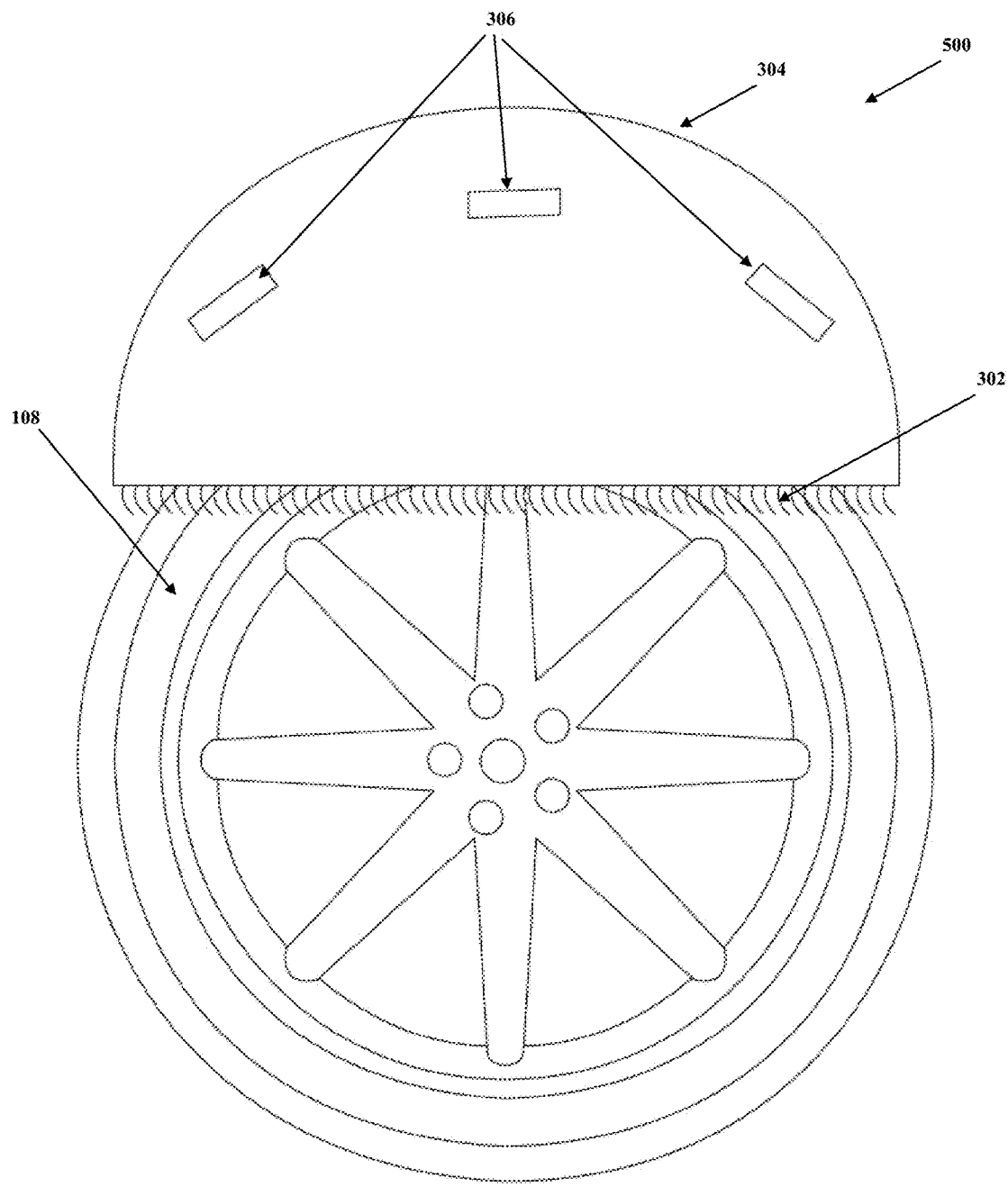
FIG. 5 shows a side view of a cleaning implement having the attached rotational means in operation cleaning a wheel, according to an exemplary embodiment of the invention.
Figure 6:
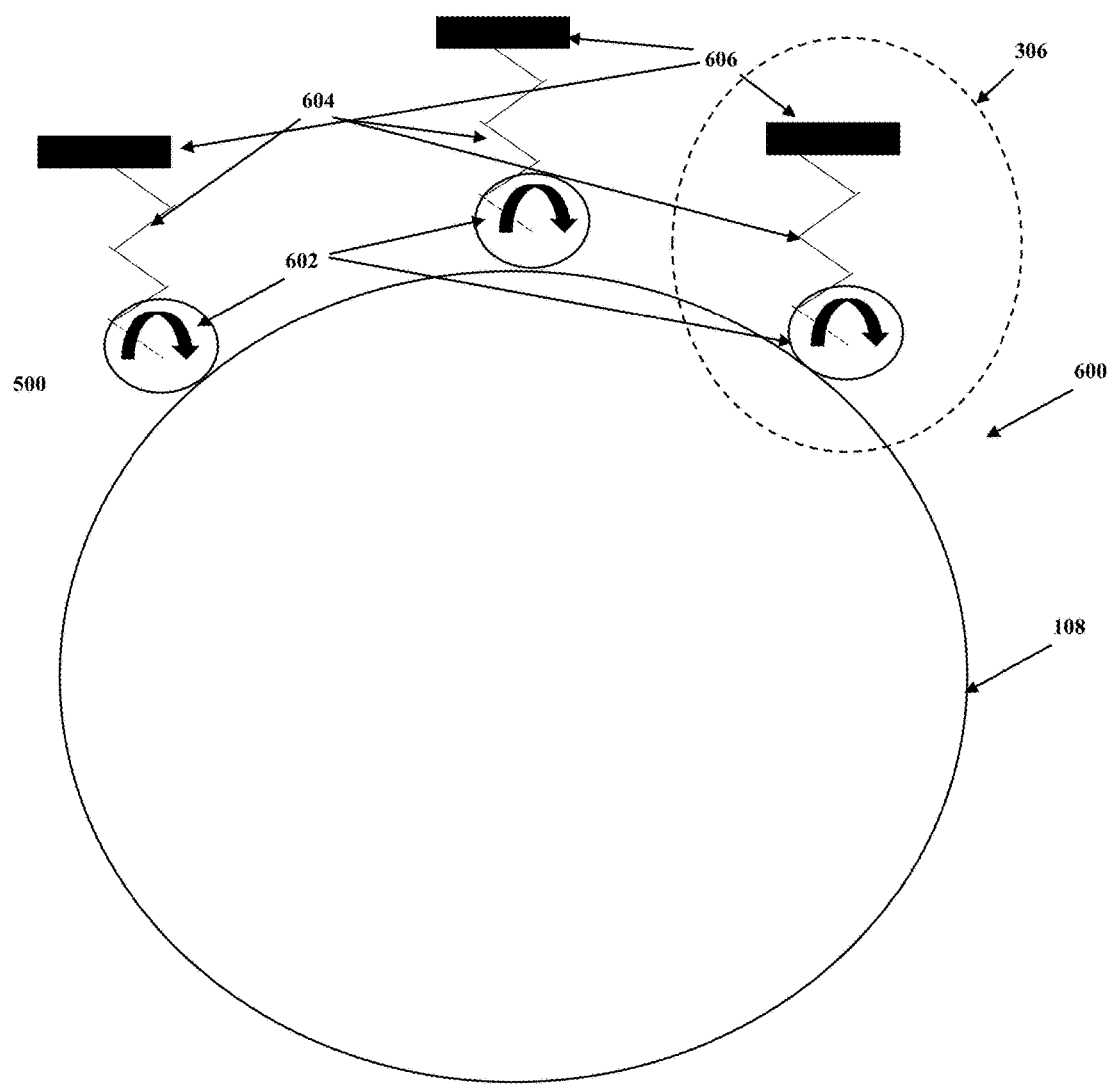
FIG. 6 shows a side view of the cleaning implement's wheel rotating means, according to an exemplary embodiment of the invention.

Referring to FIGS. 3-5 we see an exemplary embodiment of a brush in side views 300, bottom views 400 and the side operation views 500 of a brush body 304 having a shape designed to complementary fit portions of the wheel 108 periphery to be cleaned within all or part of a cavity 308 within the brush body 304 where the wheel 108 exterior are exposed to be cleaned by the brushes 302 as they come in contact with the wheel 108. Cleaning a stationary wheel is as simple 500 as displacing the brush body 304 against the wheel 108.

In one embodiment, the side/front walls 402 are made flexible or semi-flexible, so that the user may impart rotational momentum to the wheel 108 by 'squeezing' said walls 402 against the wheel walls 108, and using the imparted rotation on the wheel 108 (say while holding the wheel 108 free or above the ground) so that it's rotation against the brushes 302 then proceeds to clean it. Similarly, a solid wall unit may be used to force the rotation of the tire through the pressing of a tire portion against the front 310, back 312, or sidewalls 402 at the same time as applying pressure on the wheel 108 which will make it rotate.

As with the other embodiments, the unit may be made to be powered, so that simple activation of one or more electrical or mechanical batteries forces (via a switch and/or mechanical pressure) causes mechanical motion assistance means 306 to be engaged. Referring to FIG. 6 and FIGS. 7A-7C we see that these motion assistance means may be comprised of various embodiments, including drive-wheels 602, as well as contact push-tabs 702.

In one embodiment, said mechanical motion means 306 are comprised of one or more electrical drive-wheels 602 placed so that they come in contact with one or more portions of the wheel 108 (be it the external perimeter or thread, the sidewalls or even the rim). When activated, the drive-wheel 602 proceed to rotate (as seen before, being powered either by electrical motors located within the drive-wheel 602, or externally and linked to the wheel 602 via a transmission or belt.

Alternatively, the drive-wheel is powered by a mechanical battery as described before, where the pressing of the drive-wheel 602 against the wheel 108 and its pushing along the perimeter of the wheel 108 causes the drive-wheel 602 to be energized, and later on rotates the wheel 108 in the opposite direction. Similarly, a ratchet mechanism biased in one direction within said drive-wheel 602 will induce motion of the wheel 108 in said biased direction and 'free-turning' of the drive-wheel 602, resulting in the inertia of the wheel 108 to cause the cleaning of the wheel 108 against the brushes 302.

The drive-wheels 602 may be affixed to the body 304 of the unit, and/or in an alternate embodiment be attached to said body 304 via compliant means 604 (such as springs, pushrods, leafs, etc.) so that the drive-wheel 602 mechanically comply to the variations in the wheel 108 surface.

Figures 7A, 7B, 7C:
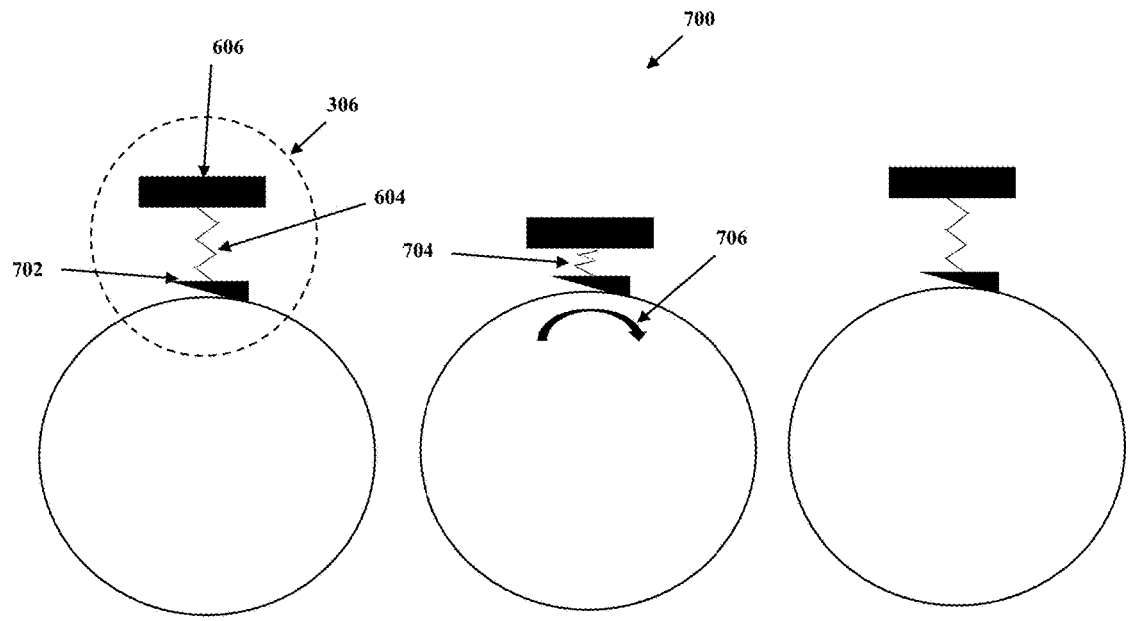
FIGS. 7A-7C show a side view of another implementation of the wheel rotating means, according to an exemplary embodiment of the invention.
Figure 8:
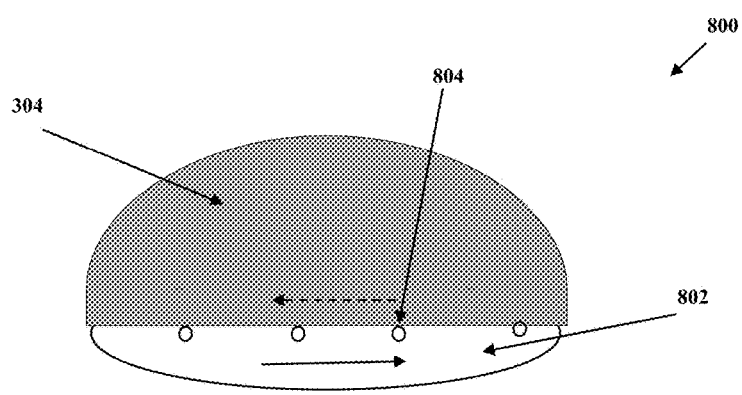
FIG. 8 shows a side view of a cleaning implement having the cleaning rotational means configured as a vertical continuous track, according to an exemplary embodiment of the invention.
Figure 9A:
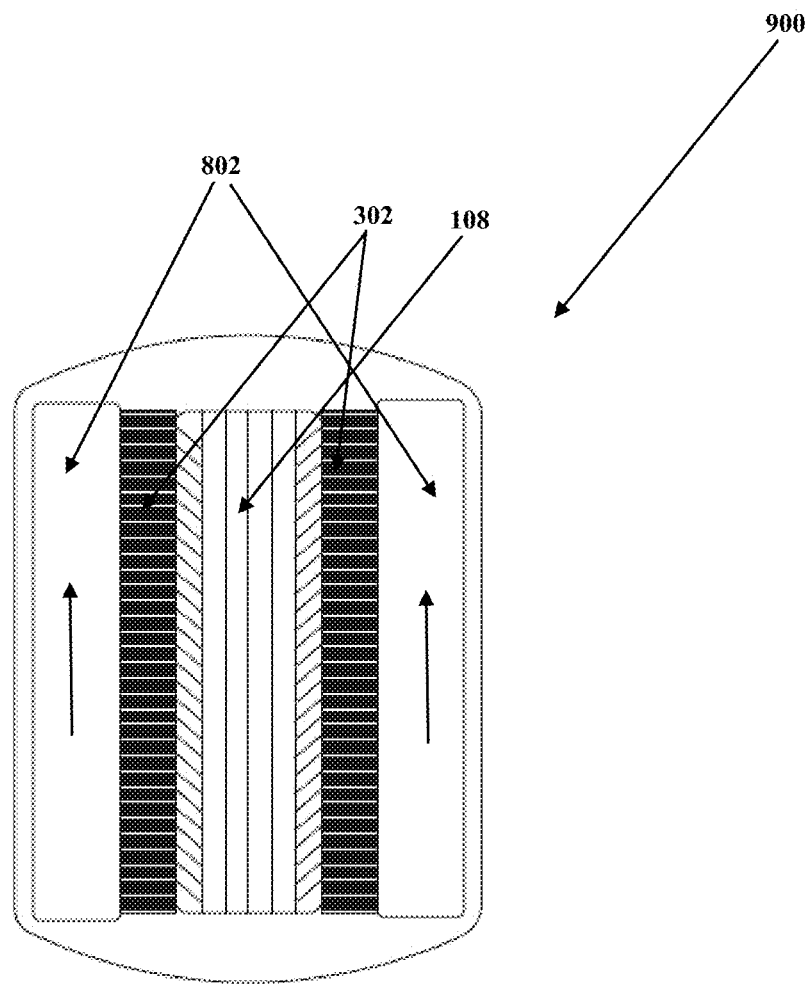
FIGS. 9A-9b show a bottom view and an interior side view of a cleaning implement having vertical continuous track rotating means, according to an exemplary embodiment of the invention.
Figure 9B:
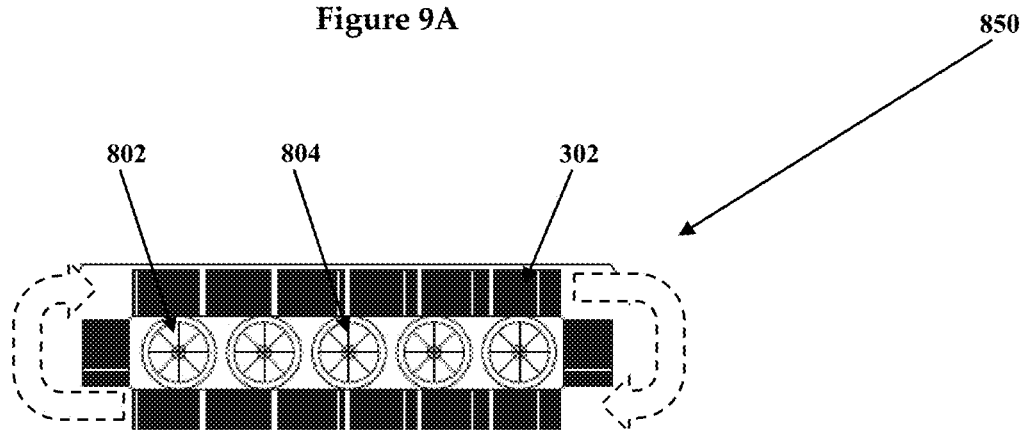
Figure 10:
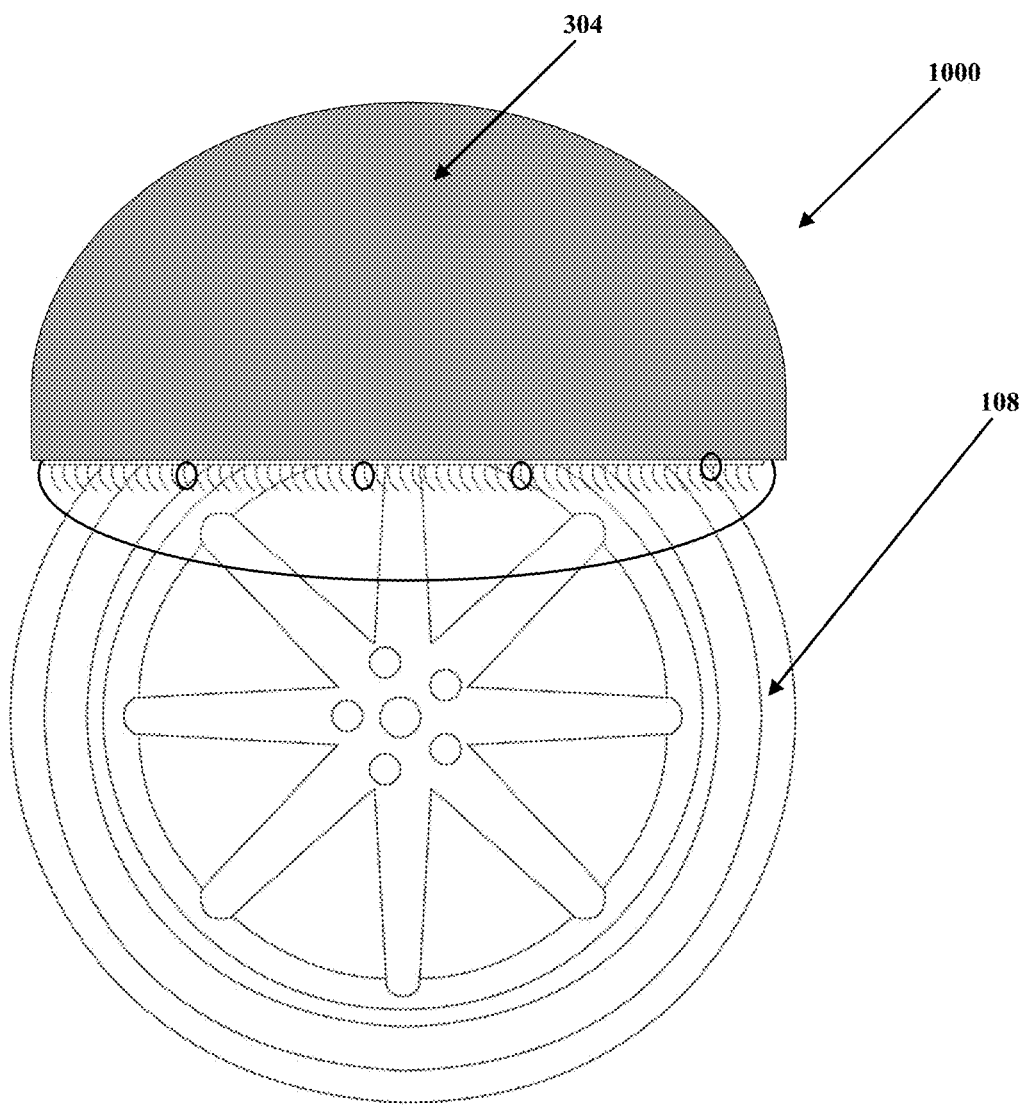
FIG. 10 shows a side view of a cleaning implement having the attached continuous track rotating means in operation cleaning a wheel, according to an exemplary embodiment of the invention.
Figure 11:
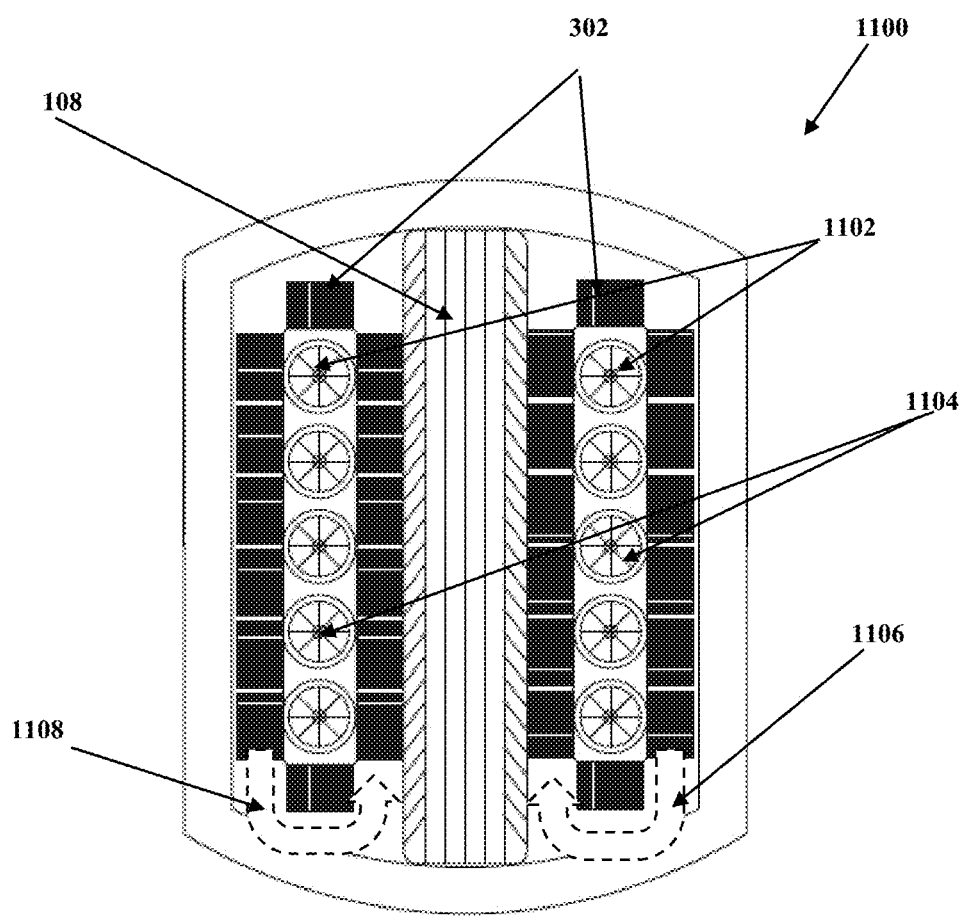
FIG. 11 shows a bottom view of a cleaning implement having horizontal continuous tract rotating means, according to an exemplary embodiment of the invention.

In another embodiment, FIGS. 7A-7C shows how the rotation of the wheel 108 is accomplished by friction against a push-tab 702, or by the compression/expansion of a push-tab 702 attached to mechanically compliant means 704 (e.g. springs, pushrods, leafs, etc.). The push-tab 702 may be comprised of a slick/slippery surface that has an angled surface so that the compression/expansion (accomplished by having the user push the brush 304 against the wheel 108, which compresses 704 the extended compliant mean 604 and which causes the push-tab 702 to impart a rotational motion 706 on the wheel 108 either during the compression or the expansion of the compliant means 704. As we see in FIG. 4, the brushes 302 may be located along the cavity 308 within the unit's body 304.

The rotation of the wheel 108 through one or more drive wheels 602 is a critical action. In one embodiment, the drive-wheels themselves are equipped with bristles or other mechanical projections, making them a combination brush assembly 102 and drive wheel 202.

Referring to FIGS. 8, 9A-9B, 10-11 we see an alternate implementation 800, 1000 where the mechanical motion assistance means are comprised of one or more "tank treads" or continuous treads rotating along pivot points containing one or more drive wheel (again, similar in operation to a tank tread, where there is one drive sprocket and one or more bogies), so that the cleaning means 302 (comprised of brushes, spikes, stubs, and/or towels) can move along the body of the wheel 108. As before, depending on the various motion mechanisms in the one or more drive wheels, the assembly may move.

In one embodiment, termed the vertical continuous tread 900, the cleaning assembly 950 on one or more sides of the brush body 304 moves along sides of the wheel 108, so that the brushes, stubs, etc. 302 make contact with the wheel body. The vertical tread moves based on the existence of one or more drive wheels 802 and/or one or more bogie wheel 804.

In an alternate embodiment 1100, the assembly is comprised of one or more horizontal continuous treads having cleaning means 302 (brush, stubs, etc.) that are rotated by either one or more drive wheels 1102 and/or one or more bogies 1104, along a complementary direction 1106, 1108, so that the wheel 108 moves.

The above embodiments may be further enhanced through their implementation on a 'sanding belt' or external cleaning means using an external track or circular rotating means having outward or externally facing cleaning means (e.g. brushes, nubs, towels etc.), both mechanically or electrically battery powered and/or unpowered as described before through the various described mechanical motion means. Activation may be through push action and/or one or more buttons located on said body 304.

Figure 12:
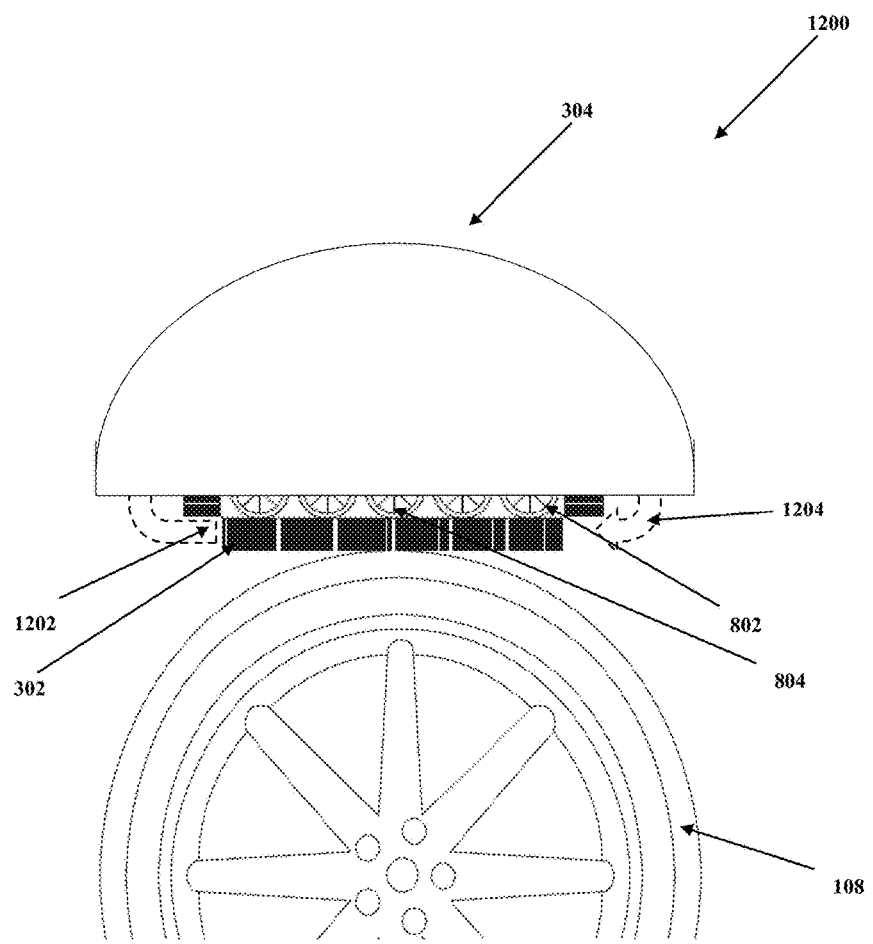
FIG. 12 shows a side view of a cleaning implement having external track rotating means, according to an exemplary embodiment of the invention.
Figure 13:
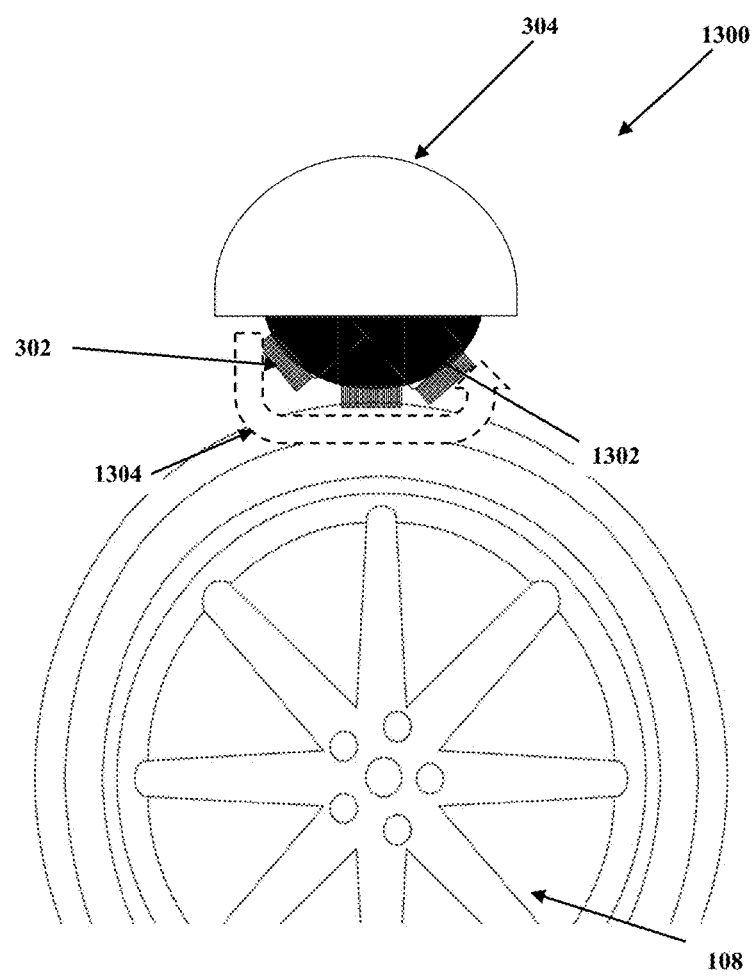
FIG. 13 shows a side view of a cleaning implement having external rotating means, according to an exemplary embodiment of the invention.

As seen in FIGS. 12-13, we can see in side views 1200, 1300, the cleaning would be accomplished by the rotation of cleaning means 302 (e.g. brushes, nubs, towels etc.) mounted on the outside of a thread 1202 or wheel 1302 or belt or tread which rotates 1204, 1304 according to any of the rotating means discussed above, making contact with the wheel 108 and accomplishing the cleaning.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. A vehicle-wheel cleaning implement comprising;
a brush body shaped to complementary fit along the periphery of a vehicle's wheel perimeter, said brush body including a cavity having one or more cleaning implements along the periphery of said cavity; and
mechanical motion assistance components located within said cavity, said components capable of inducing rotation on said vehicle's wheel at two or more points along said wheel's tread.

2. The cleaning implement of claim 1 wherein;
said mechanical motion assistance components are comprised of two or more drive-wheels, with said drive-wheels aligned so said they make contact at two or more points along said wheel's perimeter.

3. The cleaning implement of claim 2 wherein;
one or more of said drive-wheels is equipped with a ratchet mechanism that allows the rotation of said one or more drive-wheel in one direction only.

4. The cleaning implement of claim 3 wherein;
one or more of said drive-wheels is equipped with compliant components coupling it to said brush body.

5. The cleaning implement of claim 2 wherein;
said cleaning implement is equipped with kinetic energy storage components connected to one or more of said drive-wheels.

6. The cleaning implement of claim 5 wherein;
one or more of said drive-wheels is equipped with compliant components coupling it to said cleaning implement body.

7. The cleaning implement of claim 6 wherein;
said mechanical motion assistance components are comprised of one or more push-tabs.

8. The cleaning implement of claim 7 wherein;
one or more of said push-tabs is equipped with compliant components coupling it to said brush body.

9. The cleaning implement of claim 5 wherein;
said energy storage components are electric storage and these are connected to one or more electric motors powering said one or more drive-wheels, and one or more of said motors are activated through a switch in brush body.

10. The cleaning implement of claim 9 wherein;
one or more of said drive-wheels are equipped with compliant components coupling it to said brush body.

11. A vehicle-wheel cleaning implement comprising;
a brush body shaped to complementary fit along the periphery of a vehicle's wheel perimeter, said brush body including a cavity having one or more cleaning implements along the periphery of said cavity; and
mechanical motion assistance components located within said cavity, said components capable of inducing rotation on said vehicle's wheel at two or more points along said wheel's sidewall; and
said mechanical motion assistance components are comprised of flexible or semi-flexible cavity walls capable of being pressed by a user's hand so as to generate enough friction along said vehicle-wheel body to induce said vehicle-wheel's rotation.

* * * * *